United States Patent
Shirai et al.

(10) Patent No.: US 10,490,873 B2
(45) Date of Patent: Nov. 26, 2019

(54) TRANSMISSION LINE INCLUDING FIRST AND SECOND SIGNAL CONDUCTOR PATTERNS SEPARATED BY A THIRD NON-SIGNAL CONDUCTOR PATTERN WITH SPECIFIED DIMENSIONAL RELATIONSHIPS THERE BETWEEN

(71) Applicant: Yazaki Corporation, Tokyo (JP)

(72) Inventors: Mizuki Shirai, Susono (JP); Hiroki Kondo, Susono (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/718,317

(22) Filed: Sep. 28, 2017

(65) Prior Publication Data

US 2018/0115041 A1   Apr. 26, 2018

(30) Foreign Application Priority Data

Oct. 26, 2016   (JP) ................................ 2016-209291

(51) Int. Cl.
    *H01P 3/08*        (2006.01)
(52) U.S. Cl.
    CPC ............... *H01P 3/085* (2013.01); *H01P 3/08* (2013.01)
(58) Field of Classification Search
    CPC .......... H01P 3/081; H01P 3/085; H01P 3/087; H01P 3/088
    USPC ..................................................... 333/1, 238
    See application file for complete search history.

(56) References Cited

U.S. PATENT DOCUMENTS

| 4,513,266 | A | * | 4/1985 | Ishihara | H01P 3/085 174/360 |
| 5,227,742 | A | * | 7/1993 | Suzuki | H05K 1/0313 333/1 |
| 7,170,361 | B1 | * | 1/2007 | Farnworth | H01L 23/66 257/778 |
| 7,999,638 | B2 | * | 8/2011 | Niman et al. | H01P 1/203 333/238 |
| 2007/0236303 | A1 | * | 10/2007 | Lee et al. | H01P 3/081 333/1 |

FOREIGN PATENT DOCUMENTS

JP        2016-92561 A    5/2016

* cited by examiner

*Primary Examiner* — Benny T Lee
(74) *Attorney, Agent, or Firm* — Sughrue Mion, PLLC

(57) ABSTRACT

A transmission line includes first and second conductor patterns that serve as signal transmission paths, first and second insulating layers that hold the first and second conductor patterns therebetween, and a third conductor pattern that is arranged between the first and second conductor patterns. No signal is transmitted through the third conductor pattern. A relation $0.5w \le S1 \le 1.5w$ and a relation $0.5w \le S2 \le 1.5w$ are satisfied in a range of a relation $S \ge 2w$, wherein S expresses a distance between the first conductor pattern and the second conductor pattern, w expresses a width of each of the first conductor pattern and the second conductor pattern, S1 expresses a distance between the first conductor pattern and the third conductor pattern, and S2 expresses a distance between the second conductor pattern and the third conductor pattern.

7 Claims, 5 Drawing Sheets

TRANSMISSION LINE INCLUDING FIRST AND SECOND SIGNAL CONDUCTOR PATTERNS SEPARATED BY A THIRD NON-SIGNAL CONDUCTOR PATTERN WITH SPECIFIED DIMENSIONAL RELATIONSHIPS THERE BETWEEN

CROSS REFERENCE TO RELATED APPLICATIONS

This application is based on Japanese Patent Application (No. 2016-209291) filed on Oct. 26, 2016, the contents of which are incorporated herein by reference.

BACKGROUND OF THE INVENTION

1. Field of the Invention

The present invention relates to a transmission line.

2. Description of the Related Art

In the related art, transmission lines in which conductor patterns are formed to be held between insulating layers have been proposed. In such a transmission line, a plurality of conductor patterns may be provided in parallel. For example, it has been also proposed that when the plurality of conductor patterns are used as signal wires, a hole is formed between adjacent ones of the conductor patterns in order to suppress unnecessary coupling between the adjacent ones of the signal wires. Further, it has been also proposed that the conductor patterns are offset in an up/down direction. In addition, it has been also proposed that ground patterns are formed on surfaces of the insulating layers between which the conductor patterns are held, and front and back surfaces of the conductor patterns and the ground patterns are adjusted in surface roughness to thereby reduce a conductor loss (an attenuation amount of a signal) (see JP-A-2016-92561).

However, in the transmission line described in JP-A-2016-92561, in order to suppress the unnecessary coupling, for example, the hole is provided between the adjacent ones of the conductor patterns or the conductor patterns are offset in the up/down direction. This complicates manufacturing.

Further, in the transmission line described in JP-A-2016-92561, the front and back surfaces of the conductor patterns and the ground patterns have to be adjusted in surface roughness in order to reduce the conductor loss. For this reason, the number of steps of chemically or physically modifying the surfaces of the conductors increases to thereby complicate manufacturing.

In addition, it is also necessary to make characteristic impedance stable in such a transmission line.

SUMMARY OF THE INVENTION

The invention has been accomplished in order to solve such problems inherent in the related art. An object of the invention is to provide a transmission line in which unnecessary coupling is suppressed while a complication in manufacturing is suppressed, and in which characteristic impedance can be made stable and a conductor loss can be reduced.

The transmission line according to the invention is a transmission line including: first and second conductor patterns that serve as signal transmission paths; first and second insulating layers that hold the first and second conductor patterns therebetween; and a third conductor pattern that is arranged between the first and second conductor patterns, and no signal being transmitted through the third conductor pattern, wherein a relation $0.5w \leq S1 \leq 1.5w$ and a relation $0.5w \leq S2 \leq 1.5w$ are satisfied in a range of a relation $S \geq 2w$, wherein S expresses a distance between the first conductor pattern and the second conductor pattern, w expresses a width of each of the first conductor pattern and the second conductor pattern, S1 expresses a distance between the first conductor pattern and the third conductor pattern, and S2 expresses a distance between the second conductor pattern and the third conductor pattern.

According to the transmission line, the relation $S \geq 2w$ is satisfied, wherein S expresses the distance between the first and second conductor patterns and w expresses the width of each of the first and second conductor patterns. Accordingly, the distance between the conductor patterns, in each of which a signal is made to flow, is secured sufficiently so that an influence caused by unnecessary coupling can be suppressed. In the range where the distance is satisfied, the relation $0.5w \leq S1 \leq 1.5w$ and the relation $0.5w \leq S2 \leq 1.5w$ are satisfied, wherein S1 expresses the distance between the first conductor pattern and the third conductor pattern and S2 expresses the distance between the second conductor pattern and the third conductor pattern. Accordingly, the distance between each of the first and second conductor patterns and the third conductor pattern in which no signal is made to flow is secured to some degree so that characteristic impedance can be made stable. At the same time, the distance between each of the first and second conductor patterns and the third conductor pattern in which no signal is made to flow is set within a predetermined range so that an attenuation amount of a signal can be suppressed. Particularly, in the aforementioned configuration, the third conductor pattern is provided between the first and second conductor patterns. The distance between each of the first and second conductor patterns and the third conductor pattern may be adjusted if necessary. Accordingly, a hole and offset configuration, adjustment of surface roughness, etc. can be dispensed with. Thus, complication in manufacturing can be suppressed. Consequently, it is possible to provide the transmission line in which the unnecessary coupling is suppressed while the complication in manufacturing is suppressed, and in which the characteristic impedance can be made stable and a conductor loss can be reduced.

In addition, in the transmission line according to the invention, for example, the first conductor pattern, the second conductor pattern, and the third conductor pattern are substantially the same in width and substantially the same in thickness.

According to the transmission line, the first, second and third conductor patterns are substantially the same in width and substantially the same in thickness. Accordingly, three patterns which are the same in shape can be formed as the first, second and third conductor patterns so that the complication in manufacturing can be suppressed more greatly.

In addition, in the transmission line according to the invention, for example, a hole is not formed between the first and second conductor patterns in the first and second insulating layers.

According to the invention, it is possible to provide a transmission line in which unnecessary coupling is suppressed while a complication in manufacturing is suppressed, and in which characteristic impedance can be made stable and a conductor loss can be reduced.

DETAILED DESCRIPTION OF THE EXEMPLARY EMBODIMENTS

The invention will be described below in accordance with a preferred embodiment. Incidentally, the invention is not limited to the embodiment which will be described below but may be changed suitably without departing from the gist of the invention. In addition, in the embodiment which will be described below, there is a place from which illustration or description of a part of the configuration is omitted. However, it is a matter of course that, as to details of the omitted technique, a known or well-known technique can be applied as long as the technique does not cause any inconsistency with contents which will be described below.

Figure 1:
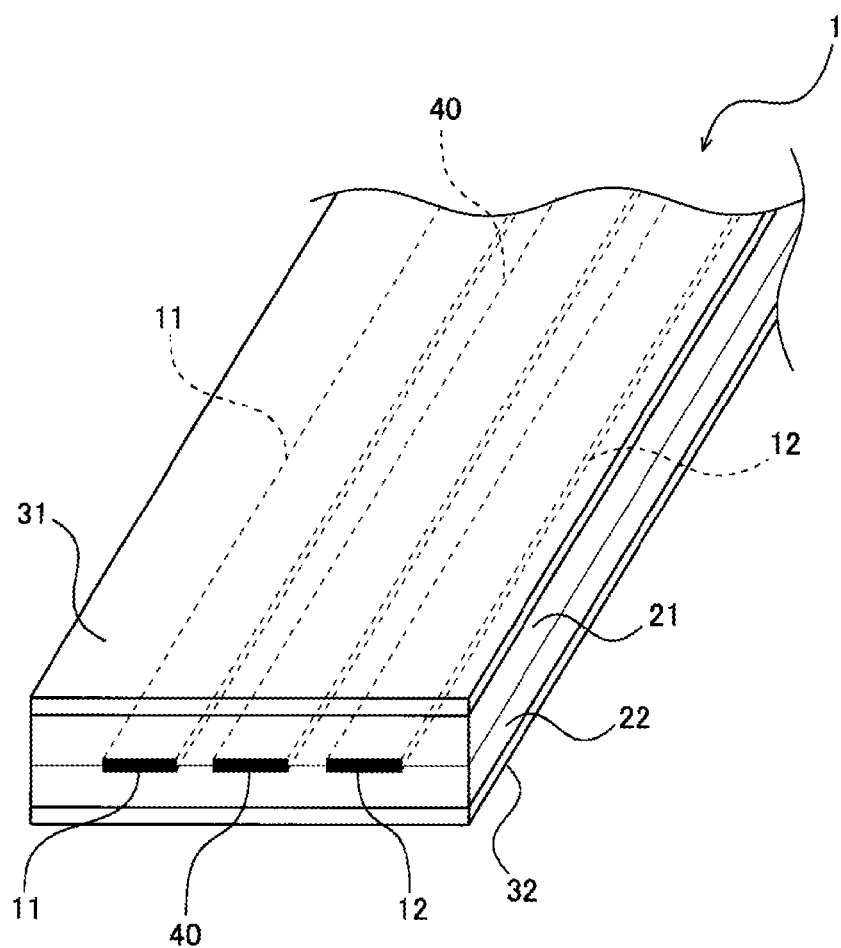
FIG. 1 is a perspective view showing a transmission line according to an embodiment of the invention.
Figure 2:
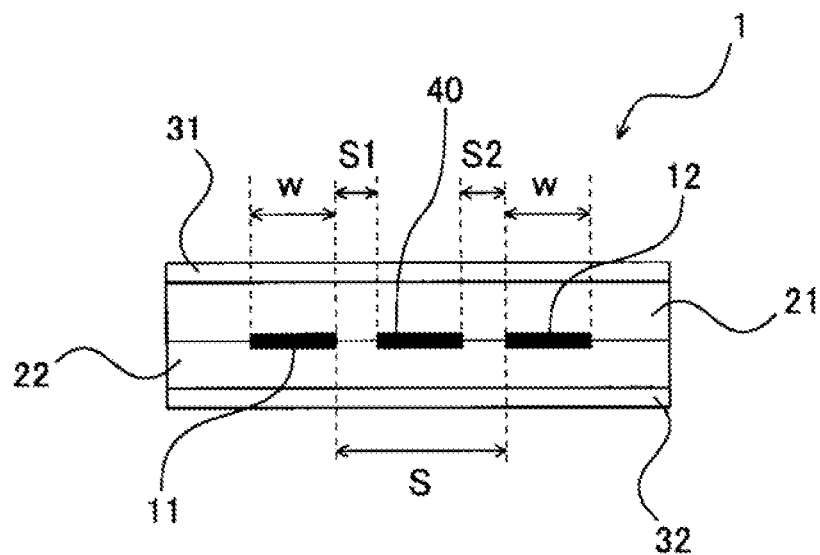
FIG. 2 is a sectional view of the transmission line shown in FIG. 1.

FIG. 1 is a perspective view showing a transmission line according to the embodiment of the invention. FIG. 2 is a sectional view of the transmission line shown in FIG. 1. As shown in FIG. 1 and FIG. 2, the transmission line 1 includes first and second conductor patterns 11 and 12, and first and second insulating layers 21 and 22. The first and second conductor patterns 11 and 12 serve as signal transmission paths disposed in parallel. The first and second conductor patterns 11 and 12 are held between the first and second insulating layers 21 and 22 so that the first and second conductor patterns 11 and 12 can be positioned on one and the same plane. Further, in the transmission line 1, ground patterns 31 and 32 are provided on surfaces (outer surfaces which are surfaces on sides not in contact with the conductor patterns 11 and 12) of the first and second insulating layers 21 and 22.

In the embodiment, the first and second conductor patterns 11 and 12 form a planar circuit for transmitting a high-frequency signal. For example, the first and second conductor patterns 11 and 12 are made of a copper material. For example, each of the first and second insulating layers 21 and 22 is made of a sheet of liquid crystal polymer (LCP). In addition, for example, the ground patterns 31 and 32 are made of a copper material in the same manner as the first and second conductor patterns 11 and 12.

Here, the first and second conductor patterns 11 and 12 are not offset in a height direction but set at the same height. Therefore, each of the first and second insulating layers 21 and 22 does not have to be formed as a multilayer but can be constituted by one layer. Incidentally, as long as the first and second conductor patterns 11 and 12 are positioned on one and the same plane, at least one of the first and second insulating layers 21 and 22 may be constituted by two or more layers.

Further, the transmission line 1 in the embodiment includes a third conductor pattern 40 provided between the first and second conductor patterns 11 and 12. The third conductor pattern 40 serves as an attenuation suppression conductor pattern in which no signal is transmitted. The attenuation suppression will be described later. The third conductor pattern 40 is provided between the first and second conductor patterns 11 and 12. Due to this positional relationship, the third conductor pattern 40 is provided at the same height as the first and second conductor patterns 11 and 12. In addition, the first and second conductor patterns 11 and 12 and the third conductor pattern 40 are substantially the same in width and substantially the same in thickness in the embodiment.

Such a transmission line 1 can dispense with a hole and offset configuration, adjustment of surface roughness, etc. Accordingly, the transmission line 1 has a structure in which complication in manufacturing can be suppressed.

Here, in the embodiment as shown in FIG. 2, a distance S between the first and second conductor patterns 11 and 12 satisfies the relation $S \geq 2w$, wherein: w expresses a width of each of the first and second conductor patterns 11 and 12. Further, a distance S1 between the first conductor pattern 11 and the third conductor pattern 40 satisfies the relation $0.5w \leq S1 \leq 1.5w$, and a distance S2 between the second conductor pattern 12 and the third conductor pattern 40 satisfies the relation $0.5w \leq S2 \leq 1.5w$.

The transmission line 1 according to the embodiment satisfies the aforementioned conditions. Accordingly, unnecessary coupling can be suppressed, characteristic impedance can be made stable, and a conductor loss can be reduced.

Next, effects of the transmission line 1 according to the embodiment will be described. However, prior to the description of the effects, configuration and effects of a transmission line according to a reference example will be described.

Figure 3:
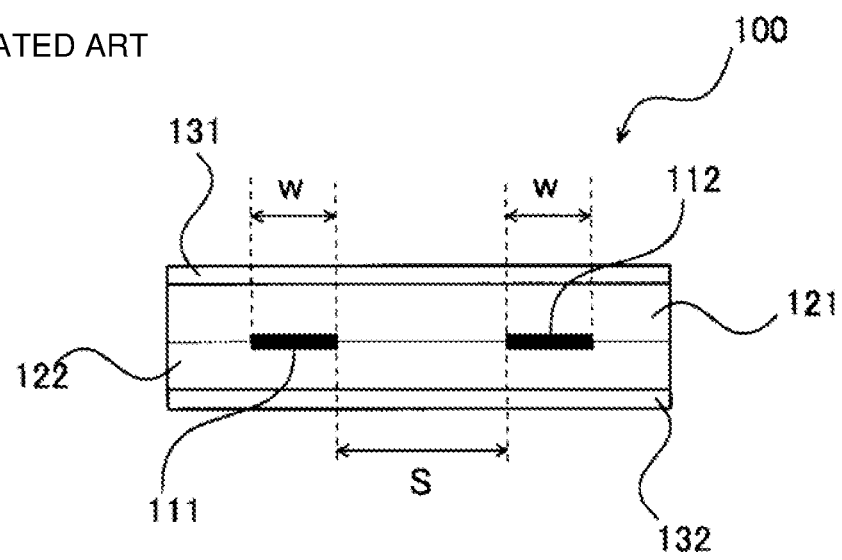
FIG. 3 is a sectional view of a transmission line according to a reference example.

FIG. 3 is a sectional view of the transmission line according to the reference example. The transmission line 100 shown in FIG. 3 has a structure in which the third conductor pattern 40 has been removed from the transmission line 1 shown in FIG. 2. That is, the transmission line 100 has the structure in which first and second conductor patterns 111 and 112 are provided to be held by first and second insulating layers 121 and 122, and ground patterns 131 and 132 are provided on surfaces of the first and second insulating layers 121 and 122. Incidentally, w expresses a width of each of the first and second conductor layers 111 and 112. In addition, S expresses a distance between the conductor patterns 111 and 112.

Figure 4:
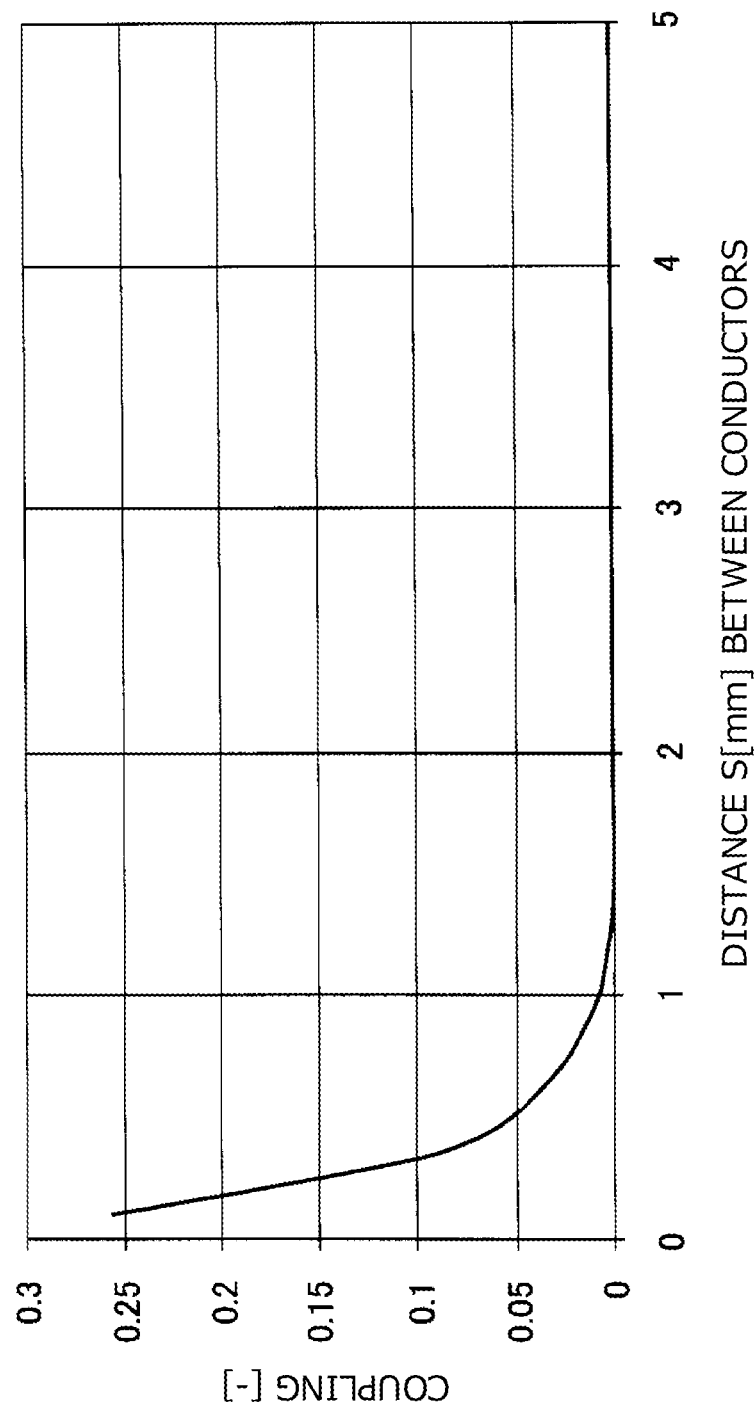
FIG. 4 is a graph showing a correlation between a distance between conductor patterns and unnecessary coupling.

FIG. 4 is a graph showing a correlation between the distance S (in mm) between the conductor patterns and unnecessary coupling (measured as coupling coefficient, which is dimensionless as designated by [-]). As shown in FIG. 4, the unnecessary coupling tends to decrease as the distance S between the conductor patterns 111 and 112 increases. When the distance S is two or more times as wide as the width w, the unnecessary coupling is approximately zero. Therefore, it can be said that the relation $S \geq 2w$ is better for the purpose of reducing the unnecessary coupling to zero approximately.

Figure 5:
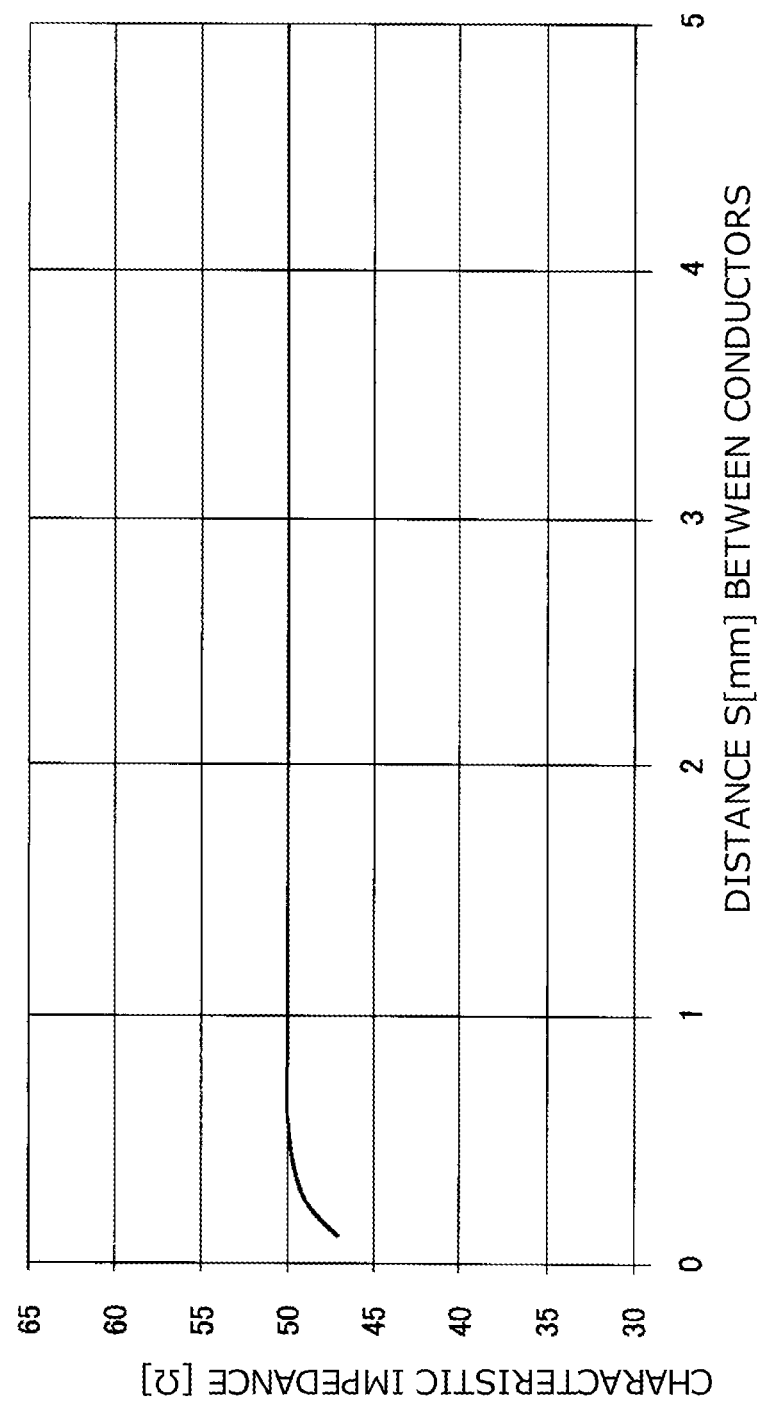
FIG. 5 is a graph showing a correlation between the distance between the conductor patterns and characteristic impedance.

FIG. 5 is a graph showing a correlation between the distance S (in mm) between the conductor patterns and characteristic impedance (measured in ohms (Ω)). As shown in FIG. 5, the characteristic impedance tends to be stable as the distance S between the conductor patterns 111 and 112 becomes larger. When the distance S is 0.5 or more times as wide as the width w, the characteristic impedance is stable. Therefore, it can be said that the relation $S \geq 0.5w$ is better for the purpose of making the characteristic impedance stable.

Accordingly, in the transmission line 100 according to the reference example, the distance S between the conductor patterns may be two or more times as wide as the width w, that is, satisfy the relation $S \geq 2w$ in order to make the characteristic impedance stable while suppressing the unnecessary coupling.

Figure 6:
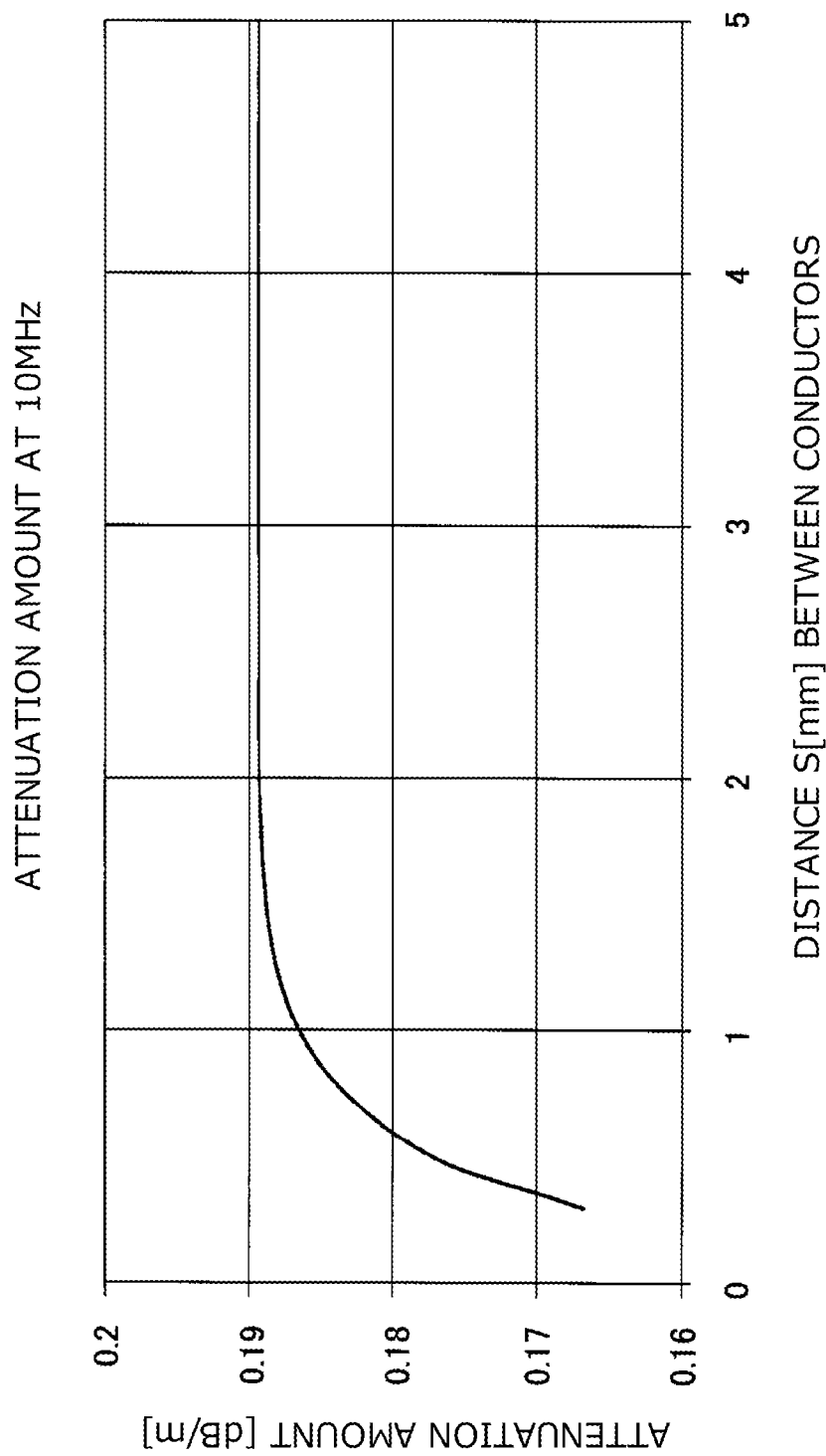
FIG. 6 is a graph showing a correlation between the distance between the conductor patterns and an attenuation amount.

FIG. 6 is a graph showing a correlation between the distance S (in mm) between the conductor patterns and an attenuation amount (measured in dB/m). Incidentally, a correlation between an attenuation amount of a signal at 10 MHz and the distance S between the conductor patterns is shown in FIG. 6. As shown in FIG. 6, as the distance S between the conductor patterns 111 and 112 increases, the attenuation amount tends to increase. When the distance S exceeds 1.5 times as wide as the width w, the attenuation amount reaches a maximum value. Therefore, it can be said that the relation $S \leq 0.5w$ is better for the purpose of reducing the attenuation of the signal.

In the transmission line 100 according to the reference example as described above, suppressing the unnecessary coupling (i.e. satisfying the relation $S \geq 2w$) and reducing the signal attenuation (i.e. satisfying the relation $S \leq 1.5w$) cannot be made compatible.

To solve this problem, the transmission line 1 according to the embodiment has the third conductor pattern 40 which is provided between the first and second conductor patterns 11 and 12. The distance S between the first and second conductor patterns 11 and 12 satisfies the relation $S \geq 2w$, the distance S1 between the first conductor pattern 11 and the third conductor pattern 40 satisfies the relation $0.5w \leq S1 \leq 1.5w$, and the distance S2 between the second conductor pattern 12 and the third conductor pattern 40 satisfies the relation $0.5w \leq S2 \leq 1.5w$.

First, according to the transmission line 1 of the embodiment, the distance S between the conductor patterns satisfies the relation $S \geq 2w$. Therefore, as shown in FIG. 4, unnecessary coupling can be reduced to approximately zero. Incidentally, the third conductor pattern 40 is provided between the first and second conductor patterns 11 and 12 in the embodiment. However, no signal flows in the third conductor pattern 40. Accordingly, induction of the signal into the first and second conductor patterns 11 and 12 does not occur and does not affect the unnecessary coupling.

In addition, according to the transmission line 1 according to the embodiment, the distance S1 between the first conductor pattern 11 and the third conductor pattern 40 satisfies the relation $0.5w \leq S1 \leq 1.5w$, and the distance S2 between the second conductor pattern 12 and the third conductor pattern 40 satisfies the relation $0.5w \leq S2 \leq 1.5w$. Here, the distances S1 and S2 are not smaller than 0.5w. Therefore, characteristic impedance can be made stable, as shown in FIG. 5. Further, the distances S1 and S2 are not larger than 1.5w. Therefore, an attenuation amount can be suppressed, as shown in FIG. 6.

As described above, suppressing the unnecessary coupling and reducing the signal attenuation can be made compatible according to the embodiment.

In this manner, according to the transmission line 1 according to the embodiment, the relation $S \geq 2w$ is satisfied, wherein: S expresses the distance between the first and second conductor patterns 11 and 12 and w expresses the width of each of the first and second conductor patterns 11 and 12. Thus, the distance between the first and second conductor patterns 11 and 12 in each of which a signal is made to flow is secured sufficiently so that the influence caused by the unnecessary coupling can be suppressed. Moreover, in the range in which the distance is satisfied, the relation $0.5w \leq S1 \leq 1.5w$ and the relation $0.5w \leq S2 \leq 1.5w$ are satisfied, wherein: S1 expresses the distance between the first conductor pattern 11 and the third conductor pattern 40 and S2 expresses the distance between the second conductor pattern 12 and the third conductor pattern 40. Accordingly, the distance between each of the first and second conductor patterns 11 and 12 and the third conductor pattern 40 is secured to some degree so that the characteristic impedance can be made stable. At the same time, the distance between each of the first and second conductor patterns 11 and 12 and the third conductor pattern 40 is set within a predetermined range so that the attenuation amount of the signal can be suppressed. Particularly, in the aforementioned configuration, the third conductor pattern 40 is provided between the first and second conductor patterns 11 and 12. The distance between each of the first and second conductor patterns 11 and 12 and the third conductor pattern 40 may be adjusted if necessary. Accordingly, a hole and offset configuration, adjustment of surface roughness, etc. can be dispensed with. Thus, complication in manufacturing can be suppressed. Consequently, it is possible to provide the transmission line 1 in which the unnecessary coupling is suppressed while the complication in manufacturing is suppressed, and in which the characteristic impedance can be made stable and a conductor loss can be reduced.

In addition, the first, second and third conductor patterns 11, 12 and 40 are substantially the same in width and substantially the same in thickness. Accordingly, three patterns which are the same in shape can be formed as the first, second and third conductor patterns 11, 12 and 40 so that the complication in manufacturing can be suppressed more greatly.

Although the invention has been described above based on the embodiment, the invention is not limited to the aforementioned embodiment. Any change may be added to the invention without departing from the gist of the invention. In addition, known or well-known techniques may be used in combination suitably as long as they can be used.

For example, the third conductor pattern 40 in the aforementioned embodiment is substantially the same in width and substantially the same in thickness as the first and second conductor patterns 11 and 12. However, the third conductor pattern 40 is not limited thereto but may be different in at least one of width and thickness from the first and second conductor patterns 11 and 12. Further, the third conductor pattern 40 may be formed to be longer in the height direction to separate the two conductor patterns 11 and 12 from each other in the height direction.

Further, the widths of the first and second conductor patterns 11 and 12 are the same in the above description. However, the widths of the first and second conductor patterns 11 and 12 are not limited thereto but may be different from each other. In this case, the aforementioned w expresses a value of a smaller one of the widths.

What is claimed is:

1. A transmission line comprising:
   first and second conductor patterns configured to serve as signal transmission paths for transmitting a signal;
   first and second insulating layers that hold the first and second conductor patterns therebetween;
   first and second ground patterns disposed on outer surfaces of the first and second insulating layers; and
   a third conductor pattern that is arranged between the first and second conductor patterns, and no signal being transmitted through the third conductor pattern,
   wherein a relation $0.5w \leq S1 \leq 1.5w$ and a relation $0.5w \leq S2 \leq 1.5w$ are satisfied in a range of a relation $S \geq 2w$, wherein S expresses a distance between the first conductor pattern and the second conductor pattern, w expresses a width of each of the first conductor pattern and the second conductor pattern, S1 expresses a distance between the first conductor pattern and the third conductor pattern, and S2 expresses a distance between the second conductor pattern and the third conductor pattern.

2. The transmission line according to claim 1, wherein the first conductor pattern, the second conductor pattern, and the third conductor pattern are each substantially the same in width and substantially the same in thickness.

3. The transmission line according to claim 1, wherein a hole is not formed between the first and second conductor patterns in the first and second insulating layers.

4. The transmission line according to claim 1, wherein each of the first and second insulating layers is made of a sheet of liquid crystal polymer.

5. The transmission line according to claim 1, wherein the first and second conductor patterns collectively form a planar circuit for transmitting the signal.

6. The transmission line according to claim 1, wherein the first and second conductor patterns and the third conductor pattern are arranged between the first and second ground patterns.

7. The transmission line according to claim 1, wherein a width of each of the first and second ground patterns are greater than the distance between the first conductor pattern and the second conductor pattern.

* * * * *